United States Patent
Fan Chiang et al.

(10) Patent No.: US 9,614,451 B2
(45) Date of Patent: Apr. 4, 2017

(54) STARTING AN ISOLATED POWER SUPPLY WITH REGULATED CONTROL POWER AND AN INTERNAL LOAD

(71) Applicant: PEGATRON CORPORATION, Taipei (TW)

(72) Inventors: Chao-Tung Fan Chiang, Taipei (TW); Jheng-Ting Jhou, Taipei (TW); Ming-Lin Hu, Taipei (TW)

(73) Assignee: PEGATRON CORPORATION, Taipei (TW)

(*) Notice: Subject to any disclaimer, the term of this patent is extended or adjusted under 35 U.S.C. 154(b) by 0 days.

(21) Appl. No.: 15/008,946

(22) Filed: Jan. 28, 2016

(65) Prior Publication Data

US 2016/0276937 A1  Sep. 22, 2016

(30) Foreign Application Priority Data

Mar. 19, 2015  (TW) .............................. 104108821 A

(51) Int. Cl.
*H02M 3/335* (2006.01)
*H02M 1/36* (2007.01)
*H02M 1/00* (2006.01)

(52) U.S. Cl.
CPC ......... *H02M 3/33561* (2013.01); *H02M 1/36* (2013.01); *H02M 3/33523* (2013.01); *H02M 2001/0006* (2013.01)

(58) Field of Classification Search
CPC ........... H02M 2001/0006; H02M 3/335–3/344
See application file for complete search history.

(56) References Cited

U.S. PATENT DOCUMENTS

| 4,617,620 | A | * | 10/1986 | Speranza | ............ | H02M 3/3385 |
| | | | | | | 123/494 |
| 5,880,942 | A | | 3/1999 | Leu | | |

(Continued)

FOREIGN PATENT DOCUMENTS

CN  2687922 Y  3/2005

OTHER PUBLICATIONS

P. L. Huang, D. Chen, C. J. Chen and Y. M. Chen, "An Adaptive High-Precision Overpower Protection Scheme for Primary-Side Controlled Flyback Converters," in IEEE Transactions on Power Electronics, vol. 26, No. 10, pp. 2817-2824, Oct. 2011.*

(Continued)

*Primary Examiner* — Harry Behm
*Assistant Examiner* — Peter Novak
(74) *Attorney, Agent, or Firm* — Muncy, Geissler, Olds & Lowe, PLLC

(57) ABSTRACT

A power apparatus for an external load comprises a transformer, a power coordinating unit, a control unit and an internal load. The transformer is adapted for transforming an input voltage into an output voltage and an auxiliary voltage in response to an operating signal. The transformer comprises a first coil, a second coil and an auxiliary coil electromagnetically coupled to one another. The power coordinating unit comprises a first resistor, a transistor, a second resistor, a diode and a capacitor. The control unit is coupled between the first node and the first coil and configured to selectively generate the operating signal. When the control unit operates in a protective mode, the control unit is configured not to generate the operating signal, the power coordinating unit is configured to generate a coordinating current supplied to the internal load by using a starting voltage of the first node.

12 Claims, 4 Drawing Sheets

(56) References Cited

U.S. PATENT DOCUMENTS

| | | |
|---|---|---|
| 6,246,596 B1 | 6/2001 | Yamazaki |
| 2007/0058398 A1 | 3/2007 | Yang et al. |
| 2008/0239767 A1* | 10/2008 | Zheng ............... H02M 3/33507 363/21.16 |

OTHER PUBLICATIONS

"TOP200-4/14 TOPSwitch Family Three-terminal off-line PWM Switch", Internet Citation, Jul. 1996 (Jul. 1996), pp. 1-16, XP002524650, Retrieved from the Internet: URL:http://www.datasheet4u.com/download.php?id=311769 [retrieved on Apr. 20, 2009].

* cited by examiner

STARTING AN ISOLATED POWER SUPPLY WITH REGULATED CONTROL POWER AND AN INTERNAL LOAD

CROSS REFERENCE TO RELATED APPLICATIONS

This Non-provisional application claims priority under 35 U.S.C. §119(a) on Patent Application No(s). 104108821 filed in Taiwan, Republic of China on Mar. 19, 2015, the entire contents of which are hereby incorporated by reference.

BACKGROUND

Technical Field

The disclosure relates to a power apparatus, in particular to a power apparatus with power coordination.

Related Art

Nowadays, various electronic devices e.g. copiers, printers, audio and video products, desktop computers and mobile computers are popular daily devices. These electronic devices obtain power through power supply which is a necessary component to supply stable and adequate power to a single or various electronic devices.

Power supply can convert AC input e.g. mains electricity into DC required by electronic device. Referring to FIG. 1, the conventional power apparatus 100 usually comprise the AC/DC power converter 200, the DC/DC power converter 300, the control unit 400 and the internal load 500. The AC/DC power converter 200 converts AC voltage (mains electricity) into DC voltage. When the control unit 400 operates in an operational mode, the control unit 400 controls the power conversion of the DC/DC power converter 300 to convert the DC voltage into various low DC voltages required by the internal load 500 and the external load 600.

However, when the control unit 400 operates in a protective mode, the control unit 400 can not control the power conversion of the DC/DC power converter 300. If the internal load 500 is a power consuming circuit, it may not get enough power to regularly operate.

SUMMARY

An aspect of the invention is to provide a power apparatus adapted for an external load.

A power apparatus for an external load comprises a transformer, a power coordinating unit, a control unit and an internal load. The transformer is adapted for transforming an input voltage into an output voltage and an auxiliary voltage in response to an operating signal. The transformer comprises a first coil, a second coil and an auxiliary coil electromagnetically coupled to one another, the first coil is configured to receive the input voltage, the second coil is configured to provide the output voltage for the external load, and the auxiliary coil is configured to provide the auxiliary voltage.

The power coordinating unit comprises a first resistor, a transistor, a second resistor, a diode and a capacitor. The first resistor is coupled between the input voltage and a first node. A first pin of the transistor is connected to the first node and a second pin of the transistor is connected to a second node. The auxiliary coil is coupled between the second node and a ground. The second resistor is coupled between the input voltage and a third pin of the transistor. The diode is coupled between the first node and the second node. The capacitor is coupled between the first node and the ground.

The control unit is coupled between the first node and the first coil and configured to selectively generate the operating signal.

The internal load is coupled to the second node. When the control unit operates in a protective mode, the control unit is configured not to generate the operating signal, the power coordinating unit is configured to generate a coordinating current supplied to the internal load by using a starting voltage of the first node.

In one embodiment, when the control unit operates in an operational mode, the control unit is configured to generate the operating signal so the auxiliary coil accordingly generates the auxiliary voltage at the second node, the power coordinating unit is configured to cut off the coordinating current by using the auxiliary voltage, and the auxiliary voltage is adapted to be supplied to the internal load and the control unit.

In one embodiment, the control unit comprises a low-voltage locking unit and a driving unit. The low-voltage locking unit is coupled to the first node and configured to generate a control signal according to the result of comparing the starting voltage of the first node with a reference voltage. The driving unit is coupled between the low-voltage locking unit and the first coil. The driving unit is selectively enabled or disabled according to the control signal and the driving unit selectively generates the operating signal.

In one embodiment, the reference voltage includes a first comparison voltage and a second comparison voltage, the first comparison voltage is greater than the second comparison voltage, the control signal enables the driving unit if the starting voltage is greater than or equal to the first comparison voltage, and the control signal disables the driving unit if the starting voltage is smaller than or equal to the second comparison voltage.

In one embodiment, the power apparatus further comprises a switch unit. The switch unit is coupled between the driving unit and the first coil, and the driving unit selectively transmits the operating signal to the switch unit.

In one embodiment, when the control unit operates in an operational mode, the driving unit transmits the operating signal to the switch unit according to a feedback signal and a sensing signal, the feedback signal is in response to the output voltage, and the sensing signal is in response to a current flowing through the first coil.

In one embodiment, the transistor is an nMOSFET, the first pin is the gate of the nMOSFET, the second pin is the source of the NMOSFET, and the third pin is the drain of the nMOSFET.

In one embodiment, the cathode of the diode is coupled to the first node, and the anode of the diode is coupled to the second node.

In one embodiment, the resistance of the first resistor is greater than the resistance of the second resistor.

In summary, as to the power apparatus according to the embodiment, benefiting from the power coordinating unit, when the control unit operates in the protective mode, the power coordinating unit can generate and supply the stable coordinating current to the internal load. When the control unit operates in the operational mode, the auxiliary voltage generated from the transformer can be supplied to the internal load and the coordinating current is cut off by the auxiliary voltage. Because the coordinating current is cut off, it does not impact on the operation of the control unit in the operational mode. Therefore, by such configuration, the power apparatus is equipped with power coordination function.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 2:
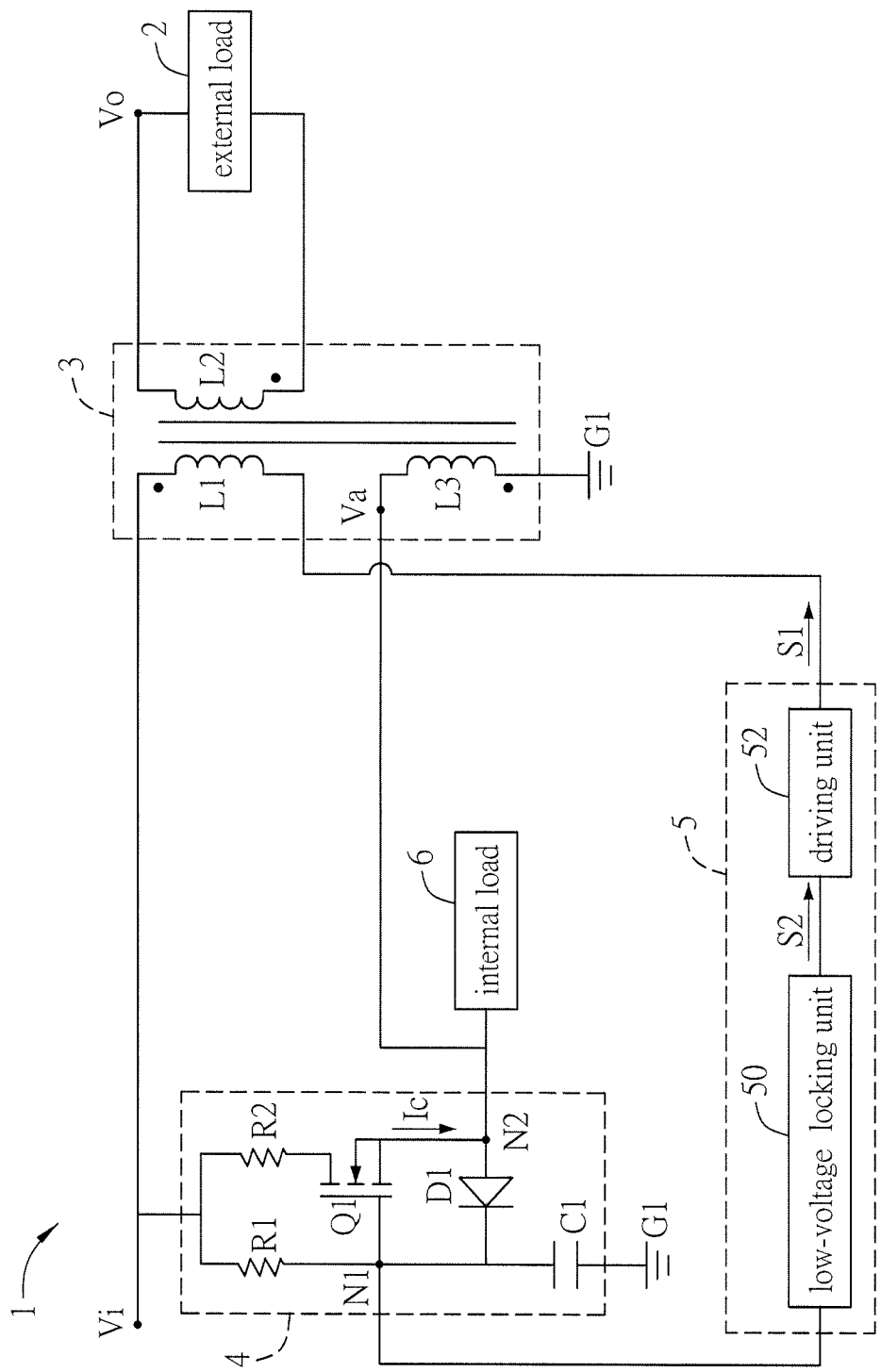
FIG. 2 is a schematic diagram showing the power apparatus according to the first embodiment.

Referring to FIG. 2, FIG. 2 is a schematic diagram showing the power apparatus according to the first embodiment. The power apparatus 1 is adapted for an external load 2. The power apparatus 1 comprises the transformer 3, the power coordinating unit 4, the control unit 5 and the internal load 6.

In the first embodiment, the transformer 3 transforms the input voltage Vi into the output voltage Vo and the auxiliary voltage Va in response to an operating signal S1. The transformer 3 comprises the first coil L1, the second coil L2 and the auxiliary coil L3 electromagnetically coupled to one another. The first coil L1 is configured to receive the input voltage Vi, the second coil L2 is configured to provide the output voltage Vo to the external load 2, and the auxiliary coil L3 is configured to provide the auxiliary voltage Va. The input voltage Vi may be a DC voltage which originates from the AC voltage (mains electricity) rectified by the bridge rectifier (not shown in the figure) of the power apparatus 1.

The power coordinating unit 4 comprises the first resistor R1, the second resistor R2, the transistor Q1, the first diode D1 and the first capacitor C1. The first resistor R1 is coupled between the input voltage Vi and the first node N1. The first pin of the transistor Q1 is connected to the first node N1, the second pin of the transistor Q1 is connected to the second node N2, and the auxiliary coil L3 is coupled between the second node N2 and the ground G1. The second resistor R2 is coupled between the input voltage Vi and the third pin of the transistor Q1. The first diode D1 is coupled between the first node N1 and the second node N2. The first capacitor C1 is coupled between the first node N1 and the ground G1.

The control unit 5 is coupled between the first node N1 and the first coil L1, and selectively generates the operating signal S1. The operating signal S1 may be a PWM (Pulse-width modulation) signal for controlling the output voltage Vo and the auxiliary voltage Va of the transformer 3. By changing the frequency of the operating signal S1, the magnitude of the output voltage Vo and the auxiliary voltage Va can be accordingly adjusted.

The internal load 6 is coupled to the second node N2. The internal load 6 may be a protection circuit or other applications of the power apparatus 1. Thus, the skilled person in the art may design various internal load 6 to enhance or expand the functions of the power apparatus 1.

When the control unit 5 operates in the protective mode, the control unit 5 is configured not to generate the operating signal S1. The power coordinating unit 4 is configured to generate the coordinating current Ic by using the starting voltage Vs at the first node N1. The coordinating current Ic is adapted to be supplied to the internal load 6.

In the embodiment, the protective mode of the control unit 5 may be triggered due to malfunctions of the power apparatus 1. For example, malfunctions may be: over-high temperature of circuit, internal or external short circuit, over-high output voltage, or over-high inductive current at primary side, etc. When the control unit 5 operates in the protective mode, the control unit 5 does not generate the operating signal S1. Thus, the transformer 3 can not transform the input voltage Vi into the output voltage Vo and the auxiliary voltage Va. At this time, the transformer 3 also can not supply power to the internal load 6 by using the auxiliary voltage Va. In this case, by using the current generated from the first resistor R1 applied with the input voltage Vi to charge the first capacitor C1, the starting voltage Vs is accordingly generated at the first node N1. The starting voltage Vs is adapted to be supplied to the control unit 5. The first diode D1 is reverse biased by the starting voltage Vs, and the transistor Q1 is conducting due to the starting voltage Vs. When the transistor Q1 is conducting, the power coordinating unit 4 can generate the coordinating current Ic flowing through the second resistor R2. Because the first diode D1 is in reverse bias, the coordinating current Ic will return to the internal load 6. Therefore, when the control unit 5 operates in the protective mode, the power coordinating unit 4 can supply power to the internal load 6 by using the coordinating current Ic.

When the control unit 5 operates in the operational mode, the control unit 5 is configured to generate the operating signal S1 so the auxiliary coil L3 accordingly generates the auxiliary voltage Va at the second node N2. The power coordinating unit 4 is configured to cut off the coordinating current Ic by using the auxiliary voltage Va. The auxiliary voltage Va is adapted to be supplied to the internal load 6 and the control unit 5.

In the embodiment, when the control unit 5 operates in the operational mode namely the power apparatus 1 regularly supplies power, the control unit 5 can generate the operating signal S1 to control the transformer 3 to transform the input voltage Vi into the output voltage Vo and the auxiliary voltage Va. At this time, the auxiliary coil L3 can generate the auxiliary voltage Va greater than the starting voltage Vs at the second node N2. The first diode D1 is forward biased by the auxiliary voltage Va, and the transistor Q1 becomes cut off due to the auxiliary voltage Va. When the transistor Q1 is cut off, the coordinating current Ic is also cut off. Thus, when the control unit 5 operates in the operational mode, the transformer 3 can supply power to the internal load 6 by using the auxiliary voltage Va. The auxiliary voltage Va also can be supplied to the control unit 5 by using the first diode D1 in forward bias.

Referring to FIG. 2, the transistor Q1 may be an nMOSFET (n-type Metal-Oxide-Semiconductor Field-Effect Transistor), the first pin can be the gate of the nMOSFET, the second pin can be the source of the nMOSFET, and the third pin can be the drain of the nMOSFET. The cathode of the first diode D1 may be coupled to the first node N1, and the anode of the first diode may be coupled to the second node N2.

In the embodiment, for example but not limited to, the resistance of the first resistor R1 may be greater than the resistance of the second resistor R2, the magnitude of the resistance of the first resistor R1 may be several megohm (MΩ), and the magnitude of the resistance of the second resistor R2 may be several kiloohm (KΩ).

Referring to FIG. 2, the control unit 5 may comprise the low-voltage locking unit 50 and the driving unit 52. The low-voltage locking unit 50 is coupled to the first node N1 and generates the control signal S2 according to the result of comparing the starting voltage Vs of the first node N1 with a reference voltage. The driving unit 52 is coupled between the low-voltage locking unit 50 and the first coil L1. The driving unit 52 is selectively enabled or disabled according to the control signal S2, and the driving unit 52 selectively generates the operating signal S1.

Figure 3:
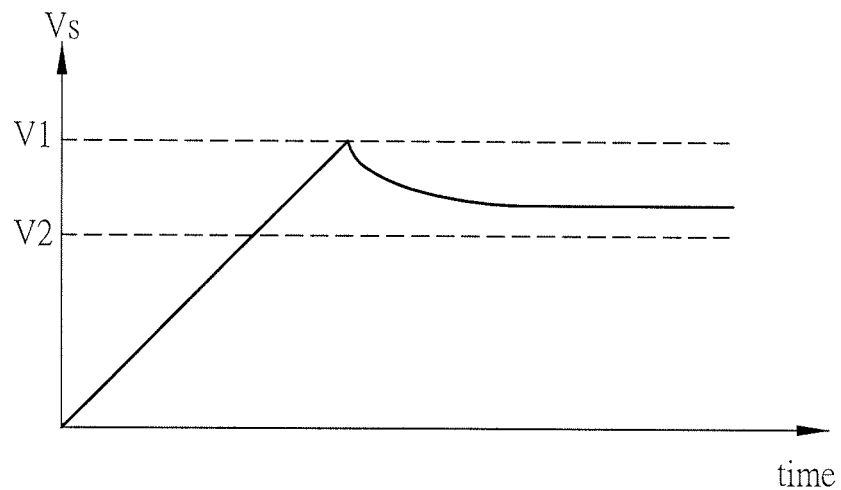
FIG. 3 is a waveform diagram of the starting voltage when the control unit operates in the operational mode according to the first embodiment.
Figure 4:
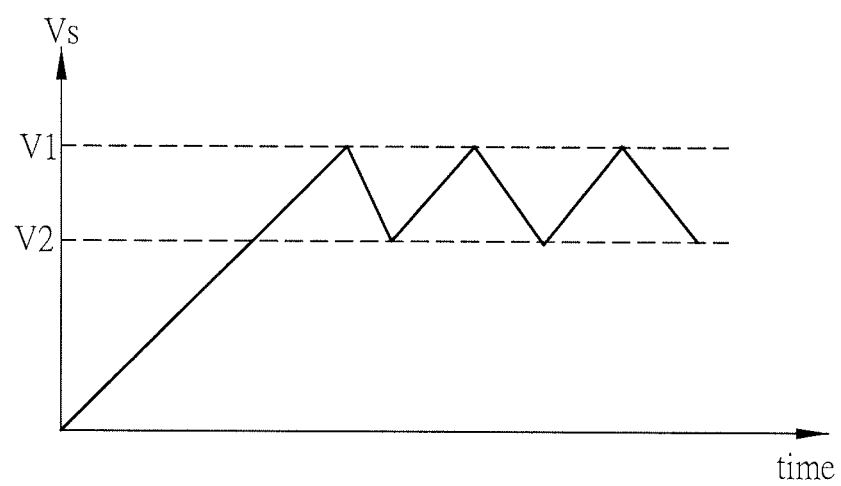
FIG. 4 is a waveform diagram of the starting voltage when the control unit operates in the protective mode according to the first embodiment.

FIG. 3 is a waveform diagram of the starting voltage when the control unit operates in the operational mode according to the first embodiment. FIG. 4 is a waveform diagram of the starting voltage when the control unit operates in the protective mode according to the first embodiment. Referring to FIG. 3 and FIG. 4, the vertical axis represents the starting voltage Vs, the horizontal axis represents time. The reference voltage may include the first comparison voltage V1 and the second comparison voltage V2. The first comparison voltage V1 is greater than the second comparison voltage V2. If the starting voltage Vs is greater than or equal to the first comparison voltage V1, the control signal S2 enables the driving unit 52. If the starting voltage Vs is smaller than or equal to the second comparison voltage V2, the control signal S2 disables the driving unit 52. The first comparison voltage V1 may be 16 Volt, the second comparison voltage V2 may be 10 volt, but they are not limited thereto.

Referring to FIG. 3, by using the current generated from the first resistor R1 applied with the input voltage Vi to charge the first capacitor C1, the starting voltage Vs is accordingly generated at the first node N1. As the starting voltage Vs steadily ascends with time to raise the starting voltage Vs to the first comparison voltage V1, the low-voltage locking unit 50 generates the control signal S2 for enabling status to enable the driving unit 52. The driving unit 52 is enabled and begins to consume the power supplied from the starting voltage Vs. At this time, the control unit 5 operates in the operational mode, so the driving unit 52 can generate the operating signal S1 to control the transformer 3 to transform the input voltage Vi into the output voltage Vo and the auxiliary voltage Va. Thus, during the period that the control unit 5 operates in the operational mode, the starting voltage Vs can be steadily supplied to the first capacitor C1 to keep stable voltage by using the auxiliary voltage Va.

Referring to FIG. 4, as the starting voltage Vs steadily ascends with time to raise the starting voltage Vs to the first comparison voltage V1, the low-voltage locking unit 50 generates the control signal S2 for enabling status to enable the driving unit 52. The driving unit 52 is enabled and begins to consume the power supplied from the starting voltage Vs. At this time, the control unit 5 operates in the protective mode, the driving unit 52 does not generate the operating signal S1, so the transformer 3 can not transform the input voltage Vi into the output voltage Vo and the auxiliary voltage Va. In this case, because the auxiliary voltage Va does not exist and the driving unit 52 begins to consume the power, the starting voltage Vs descends. Then, as the starting voltage Vs steadily descends with time to drop the starting voltage Vs to the second comparison voltage V2, the low-voltage locking unit 50 generates the control signal S2 for disabling status to disable the driving unit 52. The driving unit 52 is disabled and stops consuming the power supplied from the starting voltage Vs. At this time, by using the input voltage Vi to charge the first capacitor C1, the starting voltage Vs ascends again. Thus, during the period that the control unit 5 operates in the protective mode, the waveform of the starting voltage Vs is like an oscillatory triangle wave.

Accordingly, when the control unit 5 operates in the protective mode, the transistor Q1 becomes conducting due to the starting voltage Vs. The power coordinating unit 4 generates the coordinating current Ic which supplies power to the internal load 6 by using the starting voltage Vs. When the control unit 5 changes from the protective mode to the operational mode, the transistor Q1 becomes cut off due to the auxiliary voltage Va so the coordinating current Ic is also cut off. Because the coordinating current Ic is cut off, the coordinating current Ic will not impact on the operation of the control unit 5 in the operational mode. The transformer 3 can supply power to the internal load 6 by using the auxiliary voltage Va. The starting voltage Vs provides stable voltage for the control unit 5 by using the auxiliary voltage Va.

Figure 1:
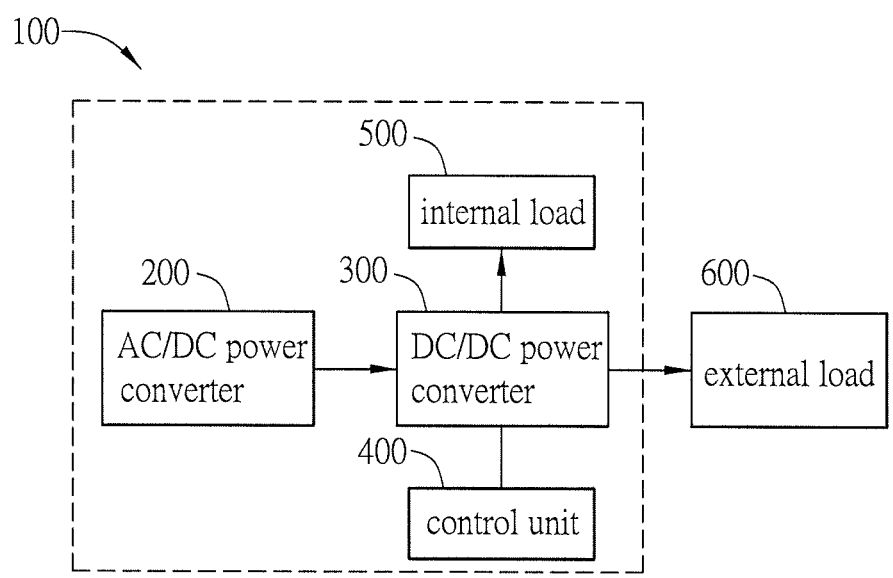
FIG. 1 is a schematic diagram showing the conventional power apparatus.
Figure 5:
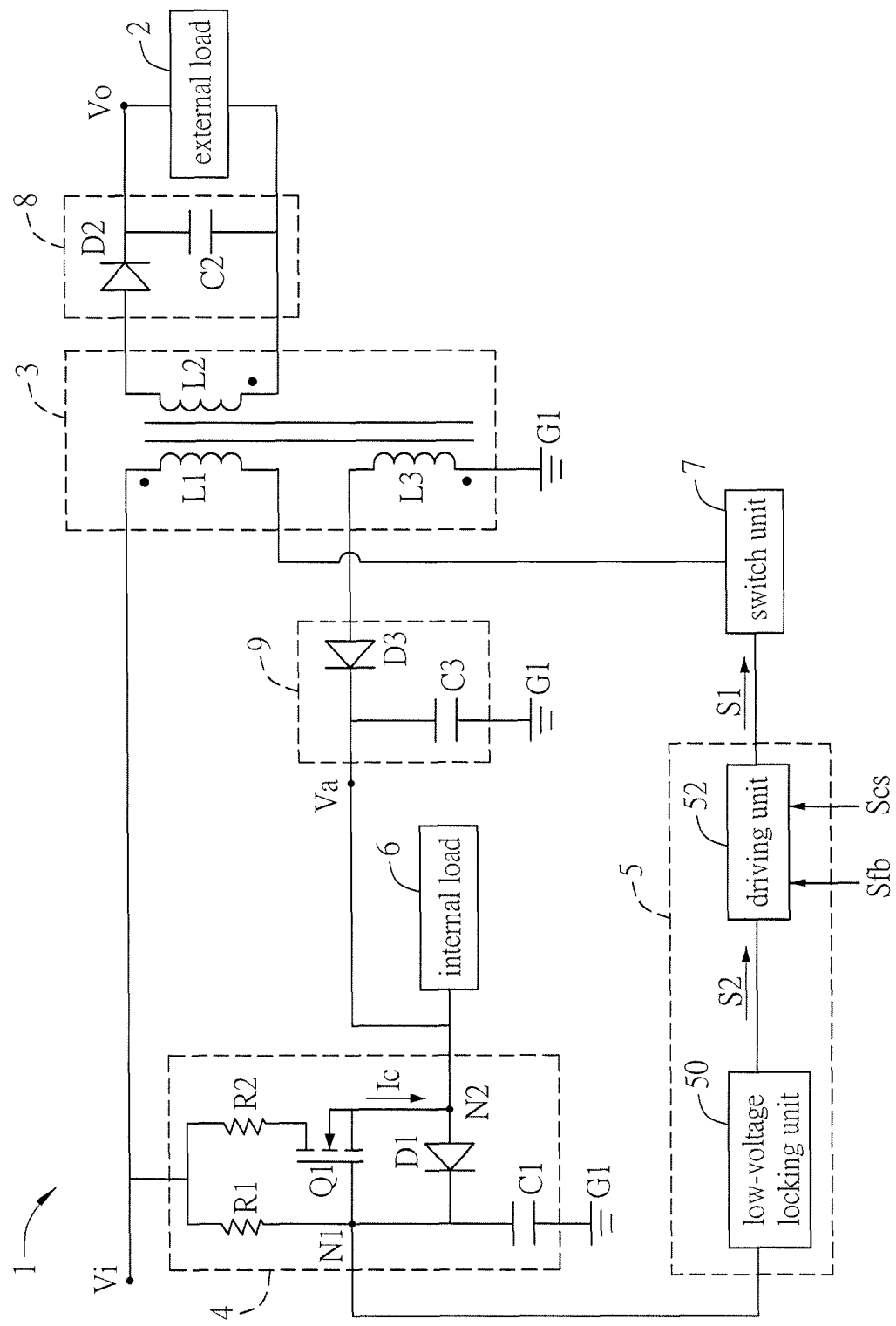
FIG. 5 is a schematic diagram showing the power apparatus according to the second embodiment.

Referring to FIG. 5, FIG. 5 is a schematic diagram showing the power apparatus according to the second embodiment. The equal or similar elements in FIG. 5 and FIG. 1 are labeled with the same reference symbols. The power apparatus 1 may be for example but not limited to a flyback power supply, a forward power supply or other type power supply.

Referring to FIG. 5, in the second embodiment, the power apparatus 1 may further comprise the switch unit 7, the first output unit 8 and the second output unit 9. The switch unit 7 is coupled between the driving unit 52 and the first coil L1. The driving unit 52 selectively transmits the operating signal S1 to the switch unit 7. The switch unit 7 may be for example but not limited to a MOSFET (Metal-Oxide-Semiconductor Field-Effect Transistor), a BJT (Bipolar Junction Transistor) or an IGBT (insulated-gate bipolar transistor).

The first output unit 8 is coupled between the second coil L2 and the external load 2. The first output unit 8 can be configured to provide the output voltage Vo to the external load 2. The first output unit 8 may comprise the second capacitor C2 and the second diode D2.

The second output unit 9 is coupled between the auxiliary coil L3 and the second node N2. The second output unit 9 can be configured to provide the auxiliary voltage Va to the internal load 6. The second output unit 9 may comprise the third capacitor C3 and the third diode D3. The third capacitor C3 is coupled between the second node N2 and the ground G1, and the third capacitor C3 is charged by the coordinating current Ic or by the energy generated from the auxiliary coil L3 so as to supply power to the internal load 6.

When the control unit 5 operates in the operational mode, the driving unit 52 can transmit the operating signal S1 to the switch unit 7 according to a feedback signal Sfb and a sensing signal Scs. The feedback signal Sfb is in response to the output voltage Vo, and the sensing signal Scs is in response to a current flowing through the first coil L1.

Accordingly, when the control unit 5 operates in the operational mode, the driving unit 52 transmits the operating signal S1 to the switch unit 7 according to the feedback signal Sfb and the sensing signal Scs to control the operation of the transformer 3. The operating signal S1 may be a PWM signal. When the switch unit 7 is conducting (turned on) in response to the PWM signal generated from the driving unit 52, the input voltage Vi is across the first coil L1 of the transformer 3 so the induction current of the first coil L1 linearly increases to store energy. At this time, because the second diode D2 is reverse biased, there is no current in the second coil L2 of the transformer 3. In addition, there is no current in the auxiliary coil L3 of the transformer 3, either.

On the other side, when the switch unit 7 is turned off in response to the PWM signal generated from the driving unit 52, according to Lenz's law, the energy stored in the first coil L1 of the transformer 3 is transferred to the second coil L2 and the auxiliary coil L3. Because the second diode D2 is conducting in forward bias, the energy transferred to the second coil L2 of the transformer 3 charges the second capacitor C2 and supplies the output voltage Vo to the external load 2. In addition, the energy transferred to the auxiliary coil L3 of the transformer 3 charges the third capacitor C3 and supplies the auxiliary voltage Va to the internal load 6.

It is seen that when the control unit 5 operates in the operational mode, the power apparatus 1 can steadily supply the output voltage Vo and the auxiliary voltage Va based on the operation manner that the operating signal S1 (PWM signal) generated from the control unit 5 alternatively turns of and off the switch unit 7.

When the control unit 5 operates in the protective mode, because the driving unit 52 does not transmit the operating signal S1 to the switch unit 7, the transformer 3 can not provide the output voltage Vo and the auxiliary voltage Va. Thus, the auxiliary voltage Va can not be supplied to the internal load 6. At this time, the waveform of the starting voltage Vs is triangle wave (as shown in FIG. 4). The starting voltage Vs reverse-biases the first diode D1, and it becomes conducting between the gate and the source of the transistor Q1. When the transistor Q1 is conducting due to the starting voltage Vs, the input voltage Vi generates the coordinating current Ic at the second resistor R2 and the coordinating current Ic can be supplied to the internal load 6.

When the control unit 5 operates in the protective mode, if the resistance of the first resistor R1 is greater than the resistance of the second resistor R2, the coordinating current Ic generated from the second resistor R2 is greater than the current generated from the first resistor R1. In this case, a larger current flowing through the second resistor R2 (the coordinating current Ic) is generated by using the smaller current originally flowing through the first resistor R1. The power coordinating unit 4 functions to enlarge the current and supplies steady power to the internal load 6 by using the larger current (the coordinating current Ic).

In summary, as to the power apparatus according to the embodiment, benefiting from the power coordinating unit, when the control unit operates in the protective mode, the power coordinating unit can generate and supply the stable coordinating current to the internal load. When the control unit changes from the protective mode to the operational mode, the auxiliary voltage generated from the transformer can be supplied to the internal load and the coordinating current is cut off by the auxiliary voltage. Because the coordinating current is cut off, it does not impact on the operation of the control unit in the operational mode. Therefore, by such configuration, the power apparatus is equipped with power coordination function.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power apparatus for an external load, comprising:
   a transformer for transforming an input voltage into an output voltage and an auxiliary voltage in response to an operating signal, wherein the transformer comprises a first coil, a second coil and an auxiliary coil electro-magnetically coupled to one another, the first coil is configured to receive the input voltage, the second coil is configured to provide the output voltage for the external load, and the auxiliary coil is configured to provide the auxiliary voltage;
   a power coordinating unit comprising:
      a first resistor coupled between the input voltage and a first node;
      a transistor of which a first pin is connected to the first node and a second pin is connected to a second node, wherein the auxiliary coil is coupled between the second node and a ground;
      a second resistor coupled between the input voltage and a third pin of the transistor;
      a diode coupled between the first node and the second node; and
      a capacitor coupled between the first node and the ground;
   a control unit coupled between the first node and the first coil and configured to selectively generate the operating signal; and
   an internal load coupled to the second node, wherein when the control unit operates in a protective mode, the control unit is configured not to generate the operating signal, the power coordinating unit is configured to generate a coordinating current supplied to the internal load by using a starting voltage of the first node.

2. The power apparatus of claim 1, wherein when the control unit operates in an operational mode, the control unit is configured to generate the operating signal so the auxiliary coil accordingly generates the auxiliary voltage at the second node, the power coordinating unit is configured to cut off the coordinating current by using the auxiliary voltage, and the auxiliary voltage is adapted to be supplied to the internal load and the control unit.

3. The power apparatus of claim 1, wherein the control unit comprises:
   a low-voltage locking unit coupled to the first node and configured to generate a control signal according to the result of comparing the starting voltage of the first node with a reference voltage; and
   a driving unit coupled between the low-voltage locking unit and the first coil, wherein the driving unit is selectively enabled or disabled according to the control signal, and the driving unit selectively generates the operating signal.

4. The power apparatus of claim 3, wherein the reference voltage includes a first comparison voltage and a second comparison voltage, the first comparison voltage is greater than the second comparison voltage, the control signal enables the driving unit if the starting voltage is greater than or equal to the first comparison voltage, and the control signal disables the driving unit if the starting voltage is smaller than or equal to the second comparison voltage.

5. The power apparatus of claim 3, further comprising:
   a switch unit coupled between the driving unit and the first coil, wherein the driving unit selectively transmits the operating signal to the switch unit.

6. The power apparatus of claim 5, wherein when the control unit operates in an operational mode, the driving unit transmits the operating signal to the switch unit according to a feedback signal and a sensing signal, the feedback signal is in response to the output voltage, and the sensing signal is in response to a current flowing through the first coil.

7. The power apparatus of claim 3, wherein the transistor is an n-MOSFET, the first pin is the gate of the nMOSFET, the second pin is the source of the nMOSFET, and the third pin is the drain of the nMOSFET.

8. The power apparatus of claim 7, wherein the cathode of the diode is coupled to the first node, and the anode of the diode is coupled to the second node.

9. The power apparatus of claim 8, wherein the resistance of the first resistor is greater than the resistance of the second resistor.

10. The power apparatus of claim 1, wherein the transistor is an nMOSFET, the first pin is the gate of the nMOSFET, the second pin is the source of the NMOSFET, and the third pin is the drain of the nMOSFET.

11. The power apparatus of claim 10, wherein the cathode of the diode is coupled to the first node, and the anode of the diode is coupled to the second node.

12. The power apparatus of claim 11, wherein the resistance of the first resistor is greater than the resistance of the second resistor.

* * * * *